United States Patent [19]
Mezger et al.

[11] Patent Number: 5,822,710
[45] Date of Patent: Oct. 13, 1998

[54] METHOD OF DETECTING ENGINE SPEED FOR DETECTING MISFIRES IN AN INTERNAL COMBUSTION ENGINE

[75] Inventors: Manfred Mezger, Markgröningen; Klaus Ries-Müller, Bad Rappenau; Rainer Frank, Sachsenheim; Christian Köhler, Ludwigsburg, all of Germany

[73] Assignee: Robert Bosch GmbH, Stuttgart, Germany

[21] Appl. No.: 658,507

[22] Filed: Jun. 10, 1996

[30] Foreign Application Priority Data

Jun. 10, 1995 [DE] Germany .................. 195 21 245.2

[51] Int. Cl.⁶ .................................................. G01M 15/00
[52] U.S. Cl. .......................... 701/110; 73/116; 123/419; 123/436
[58] Field of Search ....................... 73/116, 117.2, 73/117.3, 118.1; 123/419, 436; 364/431.03, 431.07

[56] References Cited

U.S. PATENT DOCUMENTS

| | | | |
|---|---|---|---|
| 4,780,826 | 10/1988 | Nakano et al. | 73/117.3 |
| 5,044,195 | 9/1991 | James et al. | 73/117.3 |
| 5,197,325 | 3/1993 | Tamura et al. | 73/117.3 |
| 5,216,915 | 6/1993 | Sakamoto | 73/117.3 |
| 5,263,365 | 11/1993 | Mëller et al. | 73/117.3 |
| 5,357,788 | 10/1994 | Kantschar et al. | 73/117.3 |
| 5,426,587 | 6/1995 | Imai et al. | 123/419 |
| 5,428,991 | 7/1995 | Klenk et al. | 73/116 |
| 5,452,604 | 9/1995 | Namiki et al. | 73/116 |
| 5,487,008 | 1/1996 | Ribbens et al. | 73/116 |
| 5,495,415 | 2/1996 | Ribbens et al. | 364/431.07 |
| 5,544,058 | 8/1996 | Demizu et al. | 123/419 |

FOREIGN PATENT DOCUMENTS

| | | |
|---|---|---|
| 0576705 | 1/1994 | European Pat. Off. . |
| 0583495 | 2/1994 | European Pat. Off. . |
| 0583496 | 2/1994 | European Pat. Off. . |
| 4138765 | 7/1992 | Germany . |
| WO 93/20427 | 10/1993 | WIPO . |
| WO 95/27848 | 10/1995 | WIPO . |

*Primary Examiner*—George M. Dombroske
*Attorney, Agent, or Firm*—Walter Ottesen

[57] ABSTRACT

The invention is directed to a method for detecting combustion misfires in a multicylinder internal combustion engine. The method includes the steps of: forming a criterion for the rough running of the engine for each cylinder individually on the basis of time intervals during which the crankshaft passes through predetermined angular ranges; and, forming corrective values from rough-running values for each cylinder individually during misfire-free operation so that the rough-running values for each individual cylinder coupled to said corrective values become equal with respect to each other.

8 Claims, 5 Drawing Sheets

METHOD OF DETECTING ENGINE SPEED FOR DETECTING MISFIRES IN AN INTERNAL COMBUSTION ENGINE

FIELD OF THE INVENTION

The invention relates to a method of detecting the rpm of a multicylinder internal combustion engine with high resolution on the basis of times in which the crankshaft of the engine passes through predetermined angular ranges.

The knowledge of the precise rpm (that is, the highly-resolved rpm) is especially helpful for detecting combustion misfires.

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A method operating on this basis is already known and disclosed in German patent publication 4,138,765 which corresponds to U.S patent application Ser. No. 07/818,884, filed Jan. 10, 1992, and now abandoned.

In accordance with this known method, a crankshaft angle range characterized as a segment is assigned to a specific range of the piston movement of each cylinder. These segments are realized, for example, by markings on a transducer wheel coupled to the crankshaft. The segment time is that time that it takes the crankshaft to pass through this angular range. The segment time is dependent, inter alia, on the energy converted in the combustion stroke. Misfires lead to an increase of the ignition-synchronously detected segment times. According to the known method, a measure for the rough running of the engine is computed from differences of the segment times. In addition, slow dynamic operations are compensated by computer. Such slow dynamic operations are, for example, the increase in the engine rpm when the motor vehicle is accelerated. A rough-running value, which is computed in this way for each ignition, is likewise compared to a predetermined threshold value in synchronism with the ignition. Exceeding this threshold value is evaluated as a misfire. The threshold value can be dependent on operating parameters such as load and rpm (engine speed).

The reliability of the method is decisively dependent upon the segment-time determination and therefore on the precision with which the markings can be produced on the transducer wheel during manufacture. These mechanical imprecisions can be eliminated by computation. For this purpose, U.S. Pat. No. 5,428,991 discloses to form, for example, three segment times per crankshaft revolution during overrun operation. One of the three segment times is viewed as a reference segment. The deviations of the segment times of the two remaining segments to the segment time of the reference segment are determined. Corrective values are so formed from the deviations that the segment times which are determined during overrun operation and coupled to the corrective values, are the same with respect to each other.

Deviations of the segment times (which are coupled to the corrective values and determined in normal operation outside of overrun operation) are therefore independent of manufacturing inaccuracies of the transducer wheel and provide an indication as to other causes.

One other cause comprises torsional fluctuations which are superposed on the rotational movement of the crankshaft. These torsional fluctuations occur primarily at high rpms during fired operation and lead to a systematic lengthening or shortening of the segment times of individual cylinders so that the detection of misfires is made more difficult. For this reason and also because of differences because of wear or manufacturing inaccuracies which are peculiar to a particular engine, a basic noise in the form of a scattering of the segment times remains even after adaptation of the transducer wheel. This base noise cannot be caused by the misfires. Actual misfires become ever more difficult to distinguish the lesser individual misfires operate on the rotational speed of the crankshaft. The reliability of the misfire detection therefore drops with increasing number of cylinders of the engine and with increasing rpm as well as with reducing load.

SUMMARY OF THE INVENTION

In view of this background, it is an object of the invention to provide a method which improves the reliability of the misfire detection in internal combustion engines having a high number of cylinders even at high engine speed and at low loads.

The method of the invention is for detecting combustion misfires in a multicylinder internal combustion engine. The method includes the steps of: forming a criterion for the rough running of the engine for each cylinder individually on the basis of time intervals during which the crankshaft passes through predetermined angular ranges; and, forming corrective values from rough-running values for each cylinder individually during misfire-free operation so that the rough-running values for each individual cylinder coupled to the corrective values become equal with respect to each other.

An essential element of the solution is provided by the determination of the corrective values in fired operation (that is, in normal operation outside of overrun operation).

Separate from the detection of misfires, the method is then always advantageously applicable when a highly resolved detection of rpm is required.

A criterion for the rough running of the engine is formed individually for each cylinder in order to precisely detect rpm, that is, to provide a high-resolution detection of rpm. The criterion for the rough running is formed on the basis of times in which the crankshaft of the engine passes through predetermined angular ranges and, in misfire-free operation, corrective values individual to each cylinder are so formed from rough-running values particular to each cylinder that the cylinder particular rough-running values, which are coupled to the corrective values, become the same relative to each other.

In one embodiment, the corrective values for a specific engine type are determined empirically via the performance of several experimental engines whose corrective values are then assumed for all other engines of this type.

In a preferred embodiment of the invention, these corrective values are determined for each engine individually. The basis of the method is the presence of normal operation, that is, the presence of operation without combustion misfires. If, instead, misfire operation is present, then the problem is presented that the misfires affect the determination of the corrective values. As a consequence, the effect of subsequent misfires can be suppressed by computer so that the misfires under some circumstances are no longer detected.

In one embodiment of the invention, the control apparatus can trigger injection misfires and thereafter compare the resulting rough-running values. In this way, it is possible to distinguish misfire operation from normal operation. In misfire operation, the corrective values are no longer updated.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
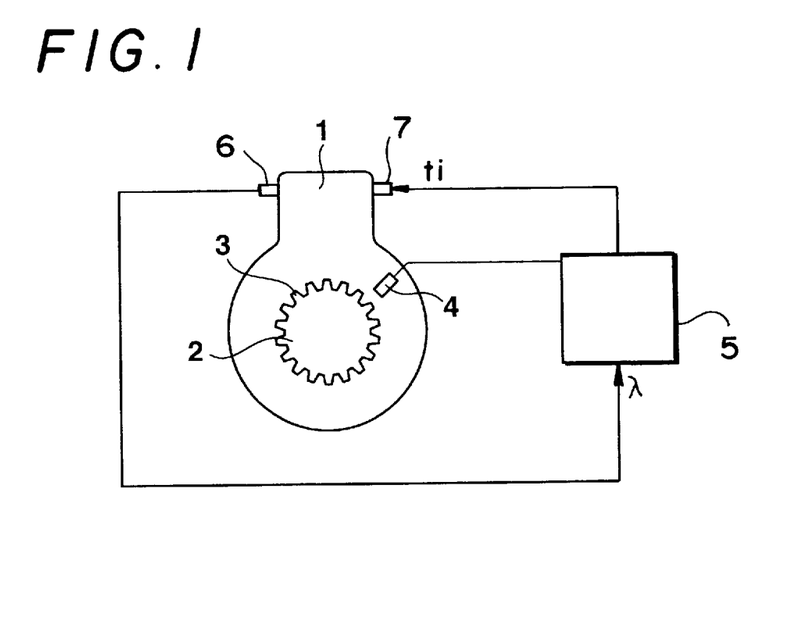
FIG. 1 is a schematic representation of an engine and a control apparatus to show the setting in which the method of the invention is applied.

FIG. 1 shows an internal combustion engine 1 equipped with an angle transducer wheel 2 which carries markings 3 as well as an angle sensor 4 and a control apparatus 5. The angle transducer wheel 2 is coupled to the crankshaft of the internal combustion engine. The rotational movement of the angle transducer wheel 2 is converted into an electrical signal with the aid of the angle sensor 4 embodied as an inductive sensor. The electrical signal has a periodicity which defines an image of the periodic passing of the markings 3 at the angle sensor 4. The time duration between an increase and a drop of a signal level therefore corresponds to the time in which the crankshaft has rotated further through an angular range corresponding to the extent of a marking. The control apparatus 5 is configured as a computer and these time durations are further processed in the computer to a measure Lut for the rough running of the internal combustion engine.

Figure 2:
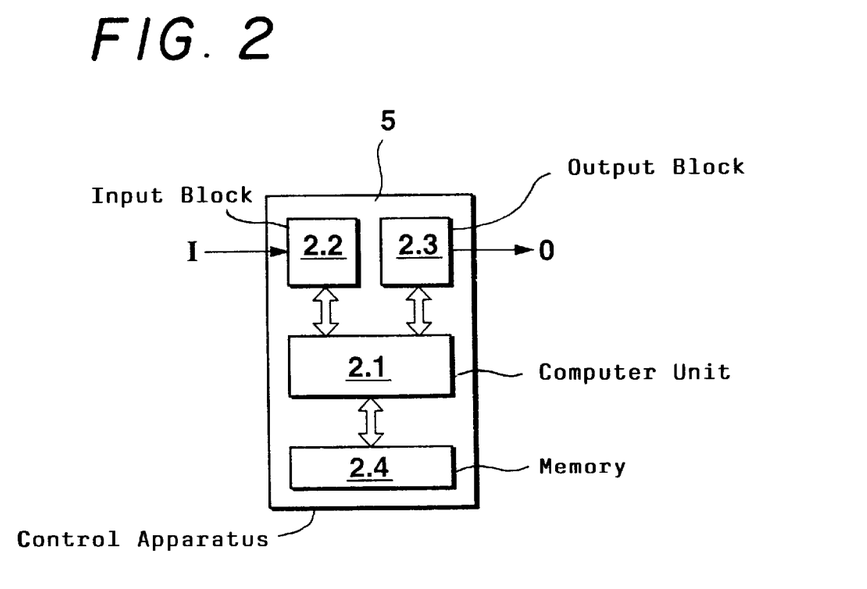
FIG. 2 is a schematic of a computer suitable for carrying out the method of the invention.

Examples of Lut computations are provided further on in this disclosure. The computer used for this purpose, can, for example, be configured as shown in FIG. 2. According to FIG. 2, a computer unit 2.1 negotiates between an input block 2.2 and an output block 2.3 while using programs and data stored in a memory 2.4.

FIG. 1 furthermore shows a known fuel/air ratio control circuit having an exhaust-gas probe 6, the control apparatus 5 and a fuel-metering device 7.

Figure 3A:
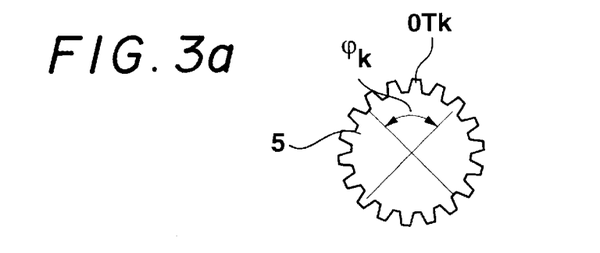
FIGS. 3a and 3b show the known principle for forming segment times as the basis of a measure or criterion for the rough running on the basis of rpm measurements.

FIG. 3a is exemplary of a subdivision of the angle transducer wheel into four segments wherein each segment has a predetermined number of markings. The marking OTk is that top dead center point of the piston movement of the kth cylinder of an internal combustion engine which, in this embodiment, is an eight-cylinder engine. The top dead center point lies in the combustion stroke of this cylinder. A rotational angular range $\phi k$ is defined about this point and extends in this embodiment over one quarter of the markings of the angle transducer wheel.

In the same manner, angular ranges $\phi 1$ to $\phi 8$ are assigned to the combustion strokes of the remaining cylinders with a four-stroke principle being assumed wherein the crankshaft rotates twice for each complete work cycle. For this reason, the range $\phi 1$ of the first cylinder corresponds to the range $\phi 5$ of the fifth cylinder and so on. The angular ranges corresponding to a rotation of the crankshaft can be separated from each other or they can be mutually adjoining or they can overlap. In the first case, markings are provided which are not assigned to any angular range and in the second case, each marking corresponds precisely to an angular range and, in the third case, respective markings correspond to different angle ranges. Accordingly, any position or length of the angle range is therefore conceivable.

Figure 3B:
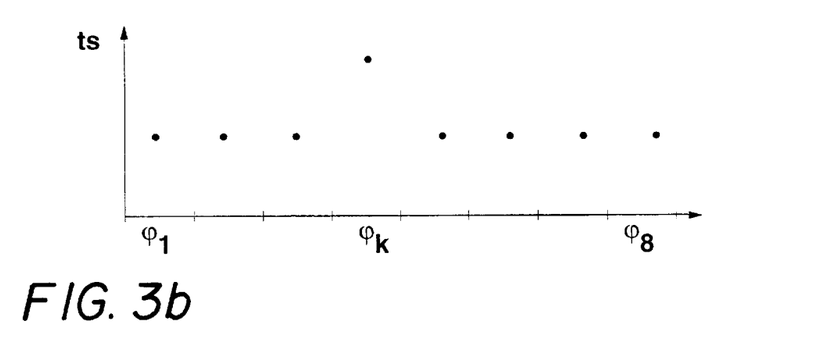
Figure 3C:
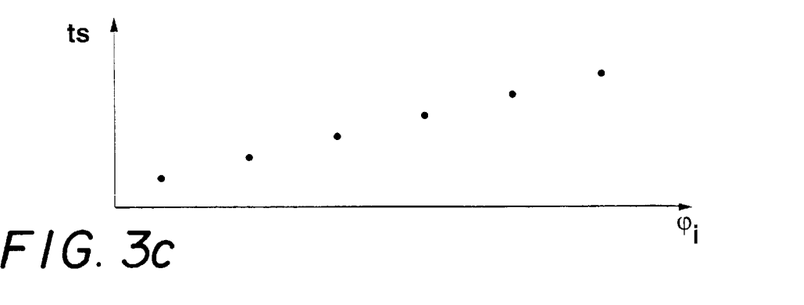
FIG. 3c shows the influence of changes in rpm on the detection of the time durations ts.

In FIG. 3b, the times (ts) are plotted along the ordinate and these times (ts) are the times in which the angle range is passed through by the rotational movement of the crankshaft. A misfire is assumed in cylinder (k). The torque interruption connected to the misfire leads to an increase of the corresponding time span (ts). The time spans (ts) then already define a measure for the rough running which is in principle suited to detect misfires. The dimension of an acceleration is imparted to the rough-running value by a suitable processing of the time spans (ts) (especially via the formation of the differences between mutually adjacent time spans and by standardizing these differences to the third power of the time span ts(i) to an ignition stroke having index (i). The rough-running value then has an improved signal/noise ratio which has been shown empirically.

Figure 4:
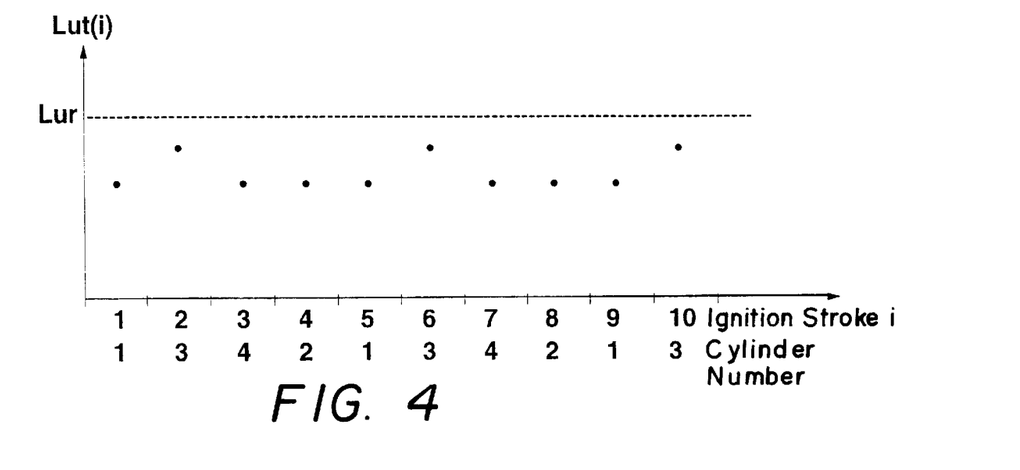
FIG. 4 shows the influence of torsion fluctuations on the determination of the rough-running values.

FIG. 4 shows the influence of the rpm changes on the detection of the time durations (ts). The case shown is for the case of a rpm reduction as is typical of that occurring in the overrun operation of a motor vehicle. This effect manifests itself in a relatively uniform extension of the detected times (ts). To dynamically compensate for this effect, it is known, for example, to form a corrective term K and to consider that the extension effect is compensated with the computation of the rough-running value.

A rough-running value, which is corrected as above, for the ignition stroke (i) of an eight-cylinder engine can, for example, be computed as follows:

Lut(i)–base term—corrective term K for dynamic compensation $$Lut(i) = \frac{ts(i+1) - ts(i)}{ts(i)^3} - \frac{((ts(i+5) - ts(i-3)/8)}{ts(i)^3}$$

The appropriate rule generalized to (z) cylinders is given as follows:

$$Lut(i) = B - K = \frac{ts(i+1) - ts(i)}{ts(i)^3} - \frac{ts\left(i + \left(\frac{z}{2}+1\right)\right) - ts\left(i - \left(\frac{z}{2}-1\right)\right)}{ts(i)^3}$$

wherein: (z)=number of cylinders of the internal combustion engine.

FIG. 4 shows rough-running values which can, for example, be computed in accordance with the rule given above for various ignition strokes (i)=1 to 10 of a four-cylinder engine. Here, an increase of the segment time occurs systematically for the third cylinder and this increase in segment time comes close to the rough-running threshold value Lur in the illustrated embodiment. This increase can, for example, be caused by a torsion fluctuation. Torsion fluctuations occur primarily at high rpm and lead to a systematic lengthening or shortening of the segment times of individual cylinders so that the misfire detection is made more difficult. The breakdown of these influences on the individual cylinders can be determined empirically for a specific engine type for specific load/rpm ranges so that these influences can be countered by corrective values stored in a load/rpm characteristic field. The corrective values are included in the evaluation of segment time.

Figure 5:
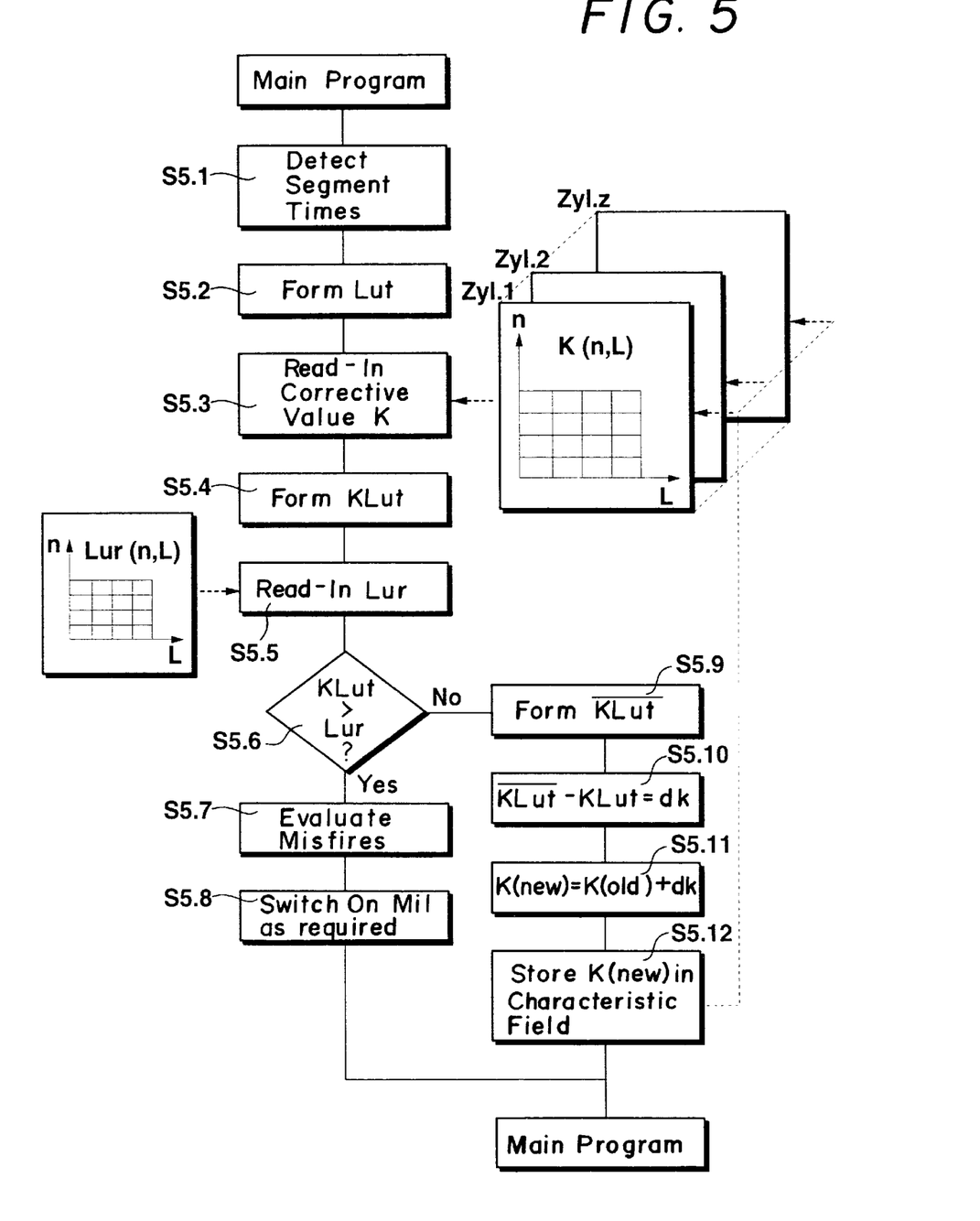
FIG. 5 shows an embodiment of the method of the invention in the context of a flowchart.

A possibility to determine corrective values of this kind is shown in FIG. 5 as a preferred embodiment of the method of the invention.

For this purpose, segment times are detected in synchronism with ignition in a step S5.1 and processed to rough-running values in step S5.2. In step S5.3, a corrective value to compensate for torsion fluctuations and similar effects are read in from a load/rpm characteristic field K(L, n). In a first runthrough of the method, only a plausible or neutral value is of concern which then assumes a value by repeated runthroughs of the method. This value is characterized in that the corrected rough-running values are the same for different cylinders. For this purpose, the rough-running values Lut are coupled in step S5.4 to the corrective value. In step S5.5, a threshold value Lur is read in from a characteristic field Lur (n,L).

The threshold value Lur can obtain an offset in dependence upon learning advancement. This offset can initially be comparatively large so that the threshold value coupled to this offset is likewise large which leads to a comparatively insensitive misfire detection. As the method advances, this offset reduces and the sensitivity of the misfire detection is increased. In this way, for example after the loss of the adaptation value in a power interruption, an uneven running of the engine is not mistakenly evaluated as misfire operation which would permanently prevent an adaptation according to step S5.6.

If this threshold value is exceeded by the corrected rough-running value in step S5.6, then this is evaluated in step S5.7 as a combustion misfire and the count of a fault counter, which is individual for a cylinder, is incremented. If the fault count exceeds a predetermined value, this leads to the output of a fault signal in step S5.8, for example, switching on a fault lamp MIL in the field of view of the driver. If this threshold value is not exceeded in step S5.6, then this is evaluated as an indication for misfire-free operation and the corrected rough-running value Klut is included in the formation of a mean value $\overline{KLut}$ in step S5.9.

Stated otherwise, the formation of the corrective value is suppressed when misfires are present, that is, as long as misfires occur, no corrective value formation takes place.

The formation of corrective values is advantageously suppressed not only with the occurrence of misfires but also when there are intense changes in rpm as they occur during rapid acceleration or braking.

For this purpose, a further inquiry can take place between the steps S5.6 and S5.9. In the context of this inquiry, the difference ts(n)−ts(n-number of cylinders) of the segment times of a cylinder is computed at the spacing of a work cycle (a camshaft revolution). The absolute amount of this difference is comparatively large for large rpm changes and is comparatively small for small rpm changes.

The corrective-value formation can therefore be suppressed when the amount of the difference exceeds a pre-given threshold value. A kind of standardization over an rpm takes place by a division of the amount of the difference by the third power of a segment time from the work cycle under consideration. The quotient lunw(w)=absolute amount (ts(n) −ts(n-number of cylinders))/(ts(n))$^3$ can therefore be compared to a threshold value for suppressing the corrective-value formation in the entire load/rpm-range. The suppression then takes place when the threshold value is exceeded.

The data that no misfire is present can therefore as shown alternatively be based on another algorithm than that of steps S5.1 to S5.6 especially on an algorithm based on an evaluation of the uncorrected segment times.

In an advantageous manner, the control takes place as to whether misfire-free operation is present via a method which is itself not dependent upon corrective values.

For this control, the evaluation of the signal of an exhaust gas probe is especially suitable as they are used by known fuel/air ratio control circuits as control sensors. In misfire-free operation, such an exhaust gas sensor shows, for example, a change of mixture composition from lean (oxygen excess) to rich (oxygen deficiency). If, however, misfires occur, then oxygen reaches the exhaust gas because of the missing combustion in the cylinder. This oxygen excess, which is caused by the combustion misfire, masks to a certain extent the deficiency in oxygen to be expected as a consequence of the enrichment. Accordingly, the signal of the exhaust gas probe does not respond to a mixture enrichment. This missing reaction of the exhaust gas probe to a mixture enrichment can therefore be applied as a first criterion as to whether misfires occur.

Thereafter, in step S5.10, the deviation dK of individual value Klut is determined from mean value $\overline{KLut}$. In step S5.12, a new corrective value K(new) is formed by addition of the deviation dK to the old corrective value K(old) and is written into the characteristic field K(n,L) of the cylinder for which the rough-running value has been determined in step S5.12. By repeated runthrough of steps S5.1 to S5.6 and S5.9 to S5.12, the characteristic field values K of the various cylinders (which belong to an operating point) are so adjusted that deviations of the corrected rough-running values of the various cylinders no longer occur in misfire-free normal operation.

In the context of a preferred embodiment, the method described above is part of a main program stored in the control apparatus of the engine. Accordingly, this part can be called up at any desired predetermined opportunity. Advantageously, the corrective values are formed with the first call up of the method when the motor vehicle is first taken into service after manufacture and then, for example, after customer service work has been carried out. In this way, the corrective values are formed individually for the engine.

In accordance with the method of the invention, the corrective values can however also be determined by experiments on individual engines of a specific type and then can be assumed, for example, in the form of a characteristic field for all engines of this type.

Figure 6:
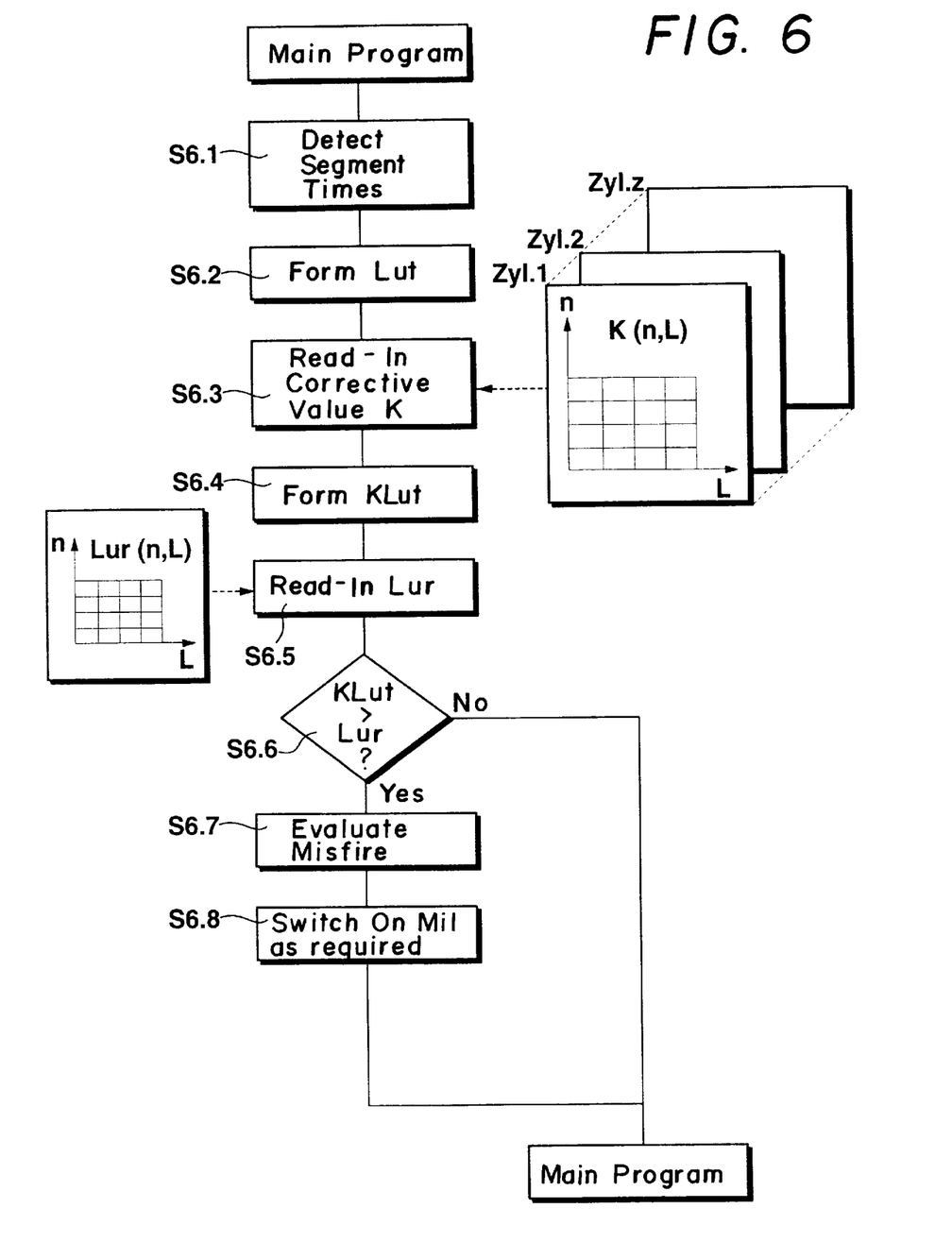
FIG. 6 shows the sequence of misfire detection for another embodiment of the invention; and, FIG. 7 shows still another embodiment of the method of the invention which facilitates determining whether normal operation is free of misfires in advance of determining the corrective values.

During operation of the engines, the misfire detection can take place in accordance with the method shown in FIG. 6. Here, the steps S6.1 to S6.8 correspond to the steps S5.1 to S5.8 of FIG. 5.

Figure 7:
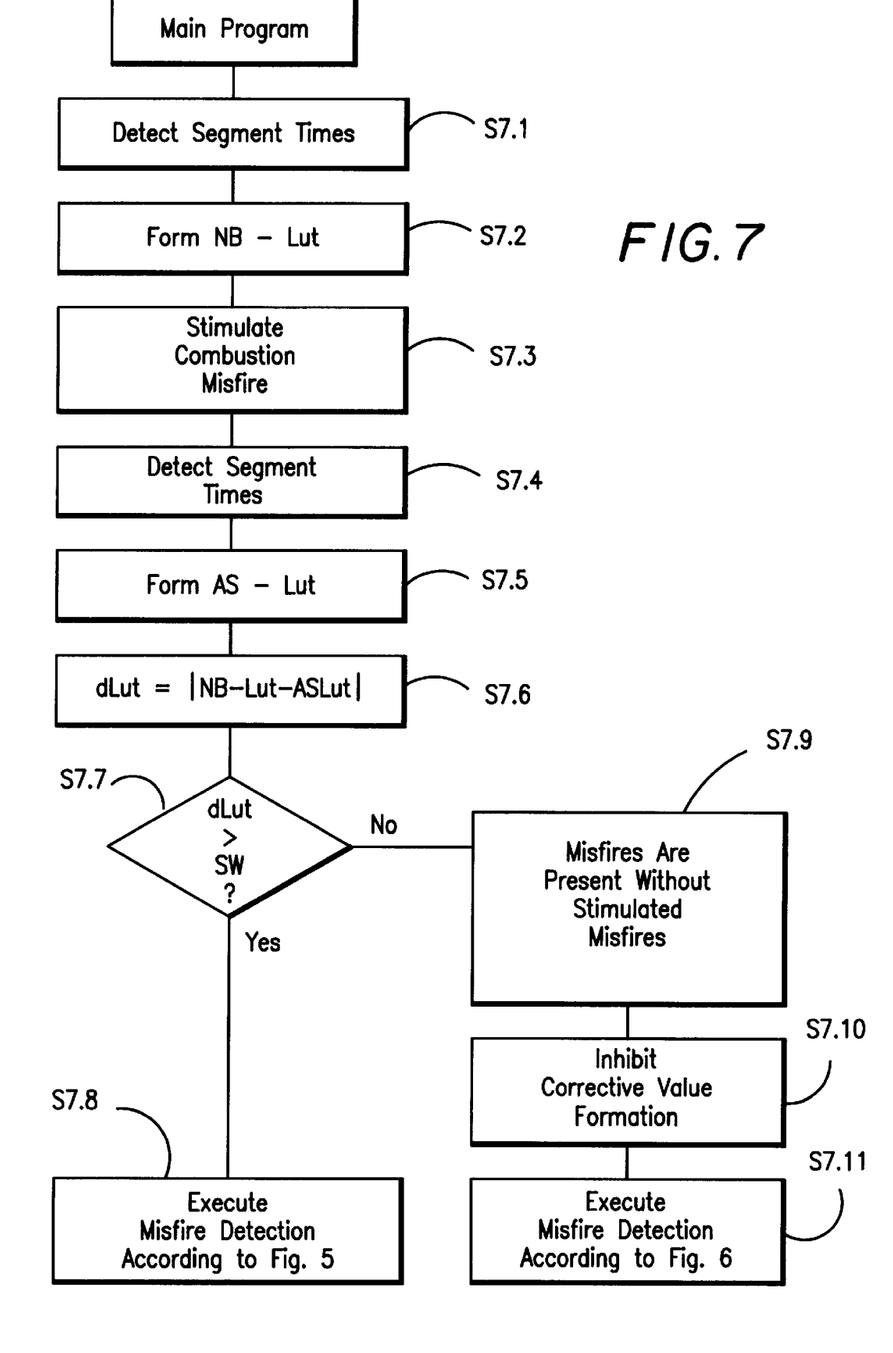

The basis of the method of the invention is the presence of normal operation, that is, of operation without combustion misfires. If instead, misfire operation is present, then the problem is presented that misfires influence the determination of the corrective values. As a consequence, the effect of subsequent misfires can be suppressed by computer so that the misfires are no longer detected under certain circumstances. FIG. 7 discloses an embodiment which enables a determination to be made as to whether a misfire-free normal operation is present in advance of the determination of the corrective values.

For this purpose, segment times are detected in a step S7.1 and processed in step S7.2 to normal operating rough-running values NB-Lut. Thereafter, the control apparatus triggers combustion misfires in step S7.3, for example, by masking individual fuel injection pulses for an engine equipped with a fuel injection device. The segment times which are detected under these conditions in step S7.4 are processed in step S7.5 to misfire operating rough-running values AS-Lut. If the amount of the difference dLut=NB-Lut–AS-Lut formed in step S7.6 is greater than a threshold value SW (which is determined in inquiry step S7.7), then the rough-running value formation has reacted to the triggering of misfires. From this, the conclusion can be drawn with a certain reliability that normal operation without misfires had been present in advance of the triggering of misfires. In this case, a determination of the corrective values according to FIG. 5 can take place via step S7.8. There is no danger that misfires can influence the formation of the corrective values.

If, in contrast, the rough-running value formation does not react to the triggering of misfires, then non-triggered misfires have apparently already occurred. In this case, the determination of the corrective values by the non-triggered misfires can be influenced. To prevent this, a negated inquiry step S7.7 is followed by an inhibition of the formation of corrective values via the steps S7.9 and S7.10 and, if required, a misfire detection in accordance with FIG. 6 (that is, with unchanged corrective values).

Stated otherwise, measures are taken which cause an increase of the rough running in comparison to a misfire-free operation. Thereafter, the rough-running is determined with and without the measures and the operation is then deemed to be without misfire without these measures when its rough running values depart from the rough-running values determined under the influence of the measures.

The increase of the rough running because of the stimulation of misfires can also be used to determine the threshold value. The stimulated misfires then define an example of measures which lead to an increase of the rough running in comparison to a misfire-free operation. To determine the threshold value, the rough-running values are determined with and without these measures and a threshold value is determined which lies between the determined rough-running values. Exceeding this threshold value is evaluated as a misfire during operation without the rough-running increasing measures.

The threshold value can be determined based on the statistical distribution of the rough-running values with and without these measures. For example, a mean value of the rough-running values with and without these measures can be determined and the threshold value can be determined as an arithmetic mean of the mean value.

The threshold value can be determined for each cylinder and in dependence upon load and rpm of the engine and then stored.

Advantageously, the threshold values, which were learned in the operating ranges having lower catalytic temperature, can be extended to other operating ranges.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multicylinder internal combustion engine which cause a rough running of said engine, the method comprising the steps of:

forming a criterion for the rough running of the engine for each cylinder individually on the basis of time segments during which the crankshaft passes through predetermined angular regions;

forming corrective values from rough-running values for each cylinder individually during misfire-free operation so that the rough-running values for each individual cylinder coupled to said corrective values become equal with respect to each other;

determining said corrective values during misfire-free normal operation for each engine individually;

deliberately triggering combustion misfires to cause an increase of the rough running when compared to a misfire-free operation;

determining the rough running as a consequence of the deliberately triggered combustion misfires and determining the rough running without said deliberately triggered combustion misfires; and, deeming the operation without said deliberately triggered combustion misfires to be misfire free when the rough-running values deviate to a predetermined extent from the rough-running values determined under the influence of said deliberately triggered combustion misfires.

2. The method of claim 1, comprising the further step of:

utilizing the duration of the time segments in which the crankshaft rotates through predetermined angular regions as a measure for the rough running.

3. The method of claim 1, comprising the further step of:

utilizing the differences of the times, in which the crankshaft exceeds predetermined angular ranges, as a measure for rough running with said differences being standardized to a power of a time assigned to a specific ignition stroke.

4. The method of claim 3, comprising the further step of:

undertaking a dynamic compensation when forming the rough-running values by compensating the effects of changes of the rpm of the engine.

5. A method for detecting combustion misfires in a multicylinder internal combustion engine which cause a rough running of said engine, the method comprising the steps of:

forming a criterion for the rough running of the engine for each cylinder individually on the basis of time segments during which the crankshaft passes through predetermined angular regions;

forming corrective values from rough-running values for each cylinder individually during misfire-free operation so that the rough-running values for each individual cylinder coupled to said corrective values become equal with respect to each other;

deliberately triggering combustion misfires to cause an increase of the rough running hen compared to a misfire-free operation;

determining first rough-running values as a consequence of the deliberately triggered combustion misfires and determining second rough running values without said deliberately triggered combustion misfires;

determining a threshold value which lies between said first and second rough-running values; and, evaluating an increase of rough running values above said threshold value during operation without said deliberately triggered combustion misfires as a misfire.

6. The method of claim 5, comprising the further step of:

determining a threshold value on the basis of the statistical distribution of the rough-running values with and without said measures.

7. The method of claim 6, comprising the further step of:

storing the determined rough-running values for each cylinder individually and in dependence upon load and rpm.

8. The method of claim 7, comprising the further step of:

extending threshold vales learned in the operating ranges with low catalytic converter temperatures to other operating ranges.

\* \* \* \* \*

UNITED STATES PATENT AND TRADEMARK OFFICE
CERTIFICATE OF CORRECTION

PATENT NO. : 5,822,710
DATED : October 13, 1998
INVENTOR(S) : Manfred Mezger, Klaus Ries-Mueller, Rainer Frank and Christian Koehler It is certified that error appears in the above-identified patent and that said Letters Patent is hereby corrected as shown below:

In column 4, line 50: delete "Lut(i)-base" and substitute -- Lut(i)=base -- therefor.

In column 8, line 64: delete "hen" and substitute -- when -- therefor.

Signed and Sealed this

Twenty-fourth Day of August, 1999

Attest:

Q. TODD DICKINSON

*Attesting Officer*   *Acting Commissioner of Patents and Trademarks*